United States Patent

Hanrahan

[15] 3,676,716

[45] July 11, 1972

[54] FAST SWITCH UTILIZING HYBRID ELECTRON-BEAM-SEMICONDUCTOR DEVICES

[72] Inventor: Donald J. Hanrahan, Falls Church, Va.

[73] Assignee: The United States of America as represented by the Secretary of the Navy

[22] Filed: May 19, 1971

[21] Appl. No.: 144,955

[52] U.S. Cl.........................307/308, 250/83.3 R, 250/211 J, 313/65 A, 328/228, 307/256

[51] Int. Cl.................H01j 29/52, H03k 17/56, H03k 17/88

[58] Field of Search...............313/66, 65 T, 65 AB; 307/256, 307/308, 311; 328/228; 250/83.3 R, 211 J

[56] References Cited

UNITED STATES PATENTS

| | | | |
|---|---|---|---|
| 2,886,739 | 5/1959 | Matthews et al. | 313/65 AB |
| 2,923,836 | 2/1960 | Richards et al. | 307/311 X |
| 3,111,556 | 11/1963 | Knoll et al. | 307/308 X |
| 3,304,429 | 2/1967 | Bonin et al. | 250/211 J |
| 3,354,312 | 11/1967 | Howell | 250/211 J |
| 3,432,670 | 3/1969 | Dym | 307/311 X |

*Primary Examiner*—John S. Heyman
*Attorney*—R. S. Sciascia, Arthur L. Branning and Philip Schneider

[57] ABSTRACT

A fast switching device employing at least two semiconductor p-n junction devices in a back-to-back arrangement with the voltage which is to be switched applied across the semiconductor devices. If the output is to be a replica of the switched voltage, the latter is also applied to control an electron beam which irradiates one or both semiconductor devices when the switch is to be closed. A square-wave output can be produced by utilizing an electron beam which is not proportional to the switched voltage but is simply turned on and off in synchronism with it and has a constant value when it is on.

6 Claims, 6 Drawing Figures

INVENTOR
DONALD J. HANRAHAN

Philip Schneider

Arthur L. Branning

ATTORNEYS

INVENTOR
DONALD J. HANRAHAN

Philip Schneider
Arthur J. Torsiglieri
ATTORNEYS

INVENTOR
DONALD J. HANRAHAN

Philip Schneider
Arthur F. Dunning
ATTORNEYS

FAST SWITCH UTILIZING HYBRID ELECTRON-BEAM-SEMICONDUCTOR DEVICES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to fast switches and especially to a hybrid switch utilizing an electron beam in conjunction with semiconductor p-n junction devices.

Present microwave switches are of the electromechanical, semiconductor diode, ferrite or gas-discharge types. Of these, semiconductor diodes are the fastest but their switching time increases with power rating. The most effective semiconductor switch uses a PIN diode which, being a double-injection device, has a switching speed limited by minority carrier storage effects. A faster switching rate can be attained with a single-injection device utilizing only majority carriers.

Another diode used for switching, the Schottky diode, also employs a single carrier, but like the PIN diode, requires a reverse bias voltage in the off-position. The optimum value of reverse voltage is half the breakdown voltage, in which case the maximum value of the alternating component of diode voltage is limited to the same value. No bias is required for the present invention; therefore the peak rf voltage may approach the breakdown voltage.

SUMMARY OF THE INVENTION

The invention comprises at least two semiconductor p-n junction devices in a back-to-back arrangement so that no current normally flows. Current proportional to the value of an applied voltage flows through the devices when one, or the other, or both devices are irradiated by an electron beam controlled by the aforementioned applied voltage.

An object of the invention is to provide very fast switching action for high-power rf voltages.

Another object is to provide very fast switching for high-power rf voltages by means of a hybrid switch utilizing solid-state p-n junction devices activated by electron beams.

A further object is to provide very fast switching action for electrical signals, in general.

Other objects, advantages and novel features of the invention will become apparent from the following detailed description of the invention when considered in conjunction with the accompanying drawings wherein:

DETAILED DESCRIPTION

Figure 1:
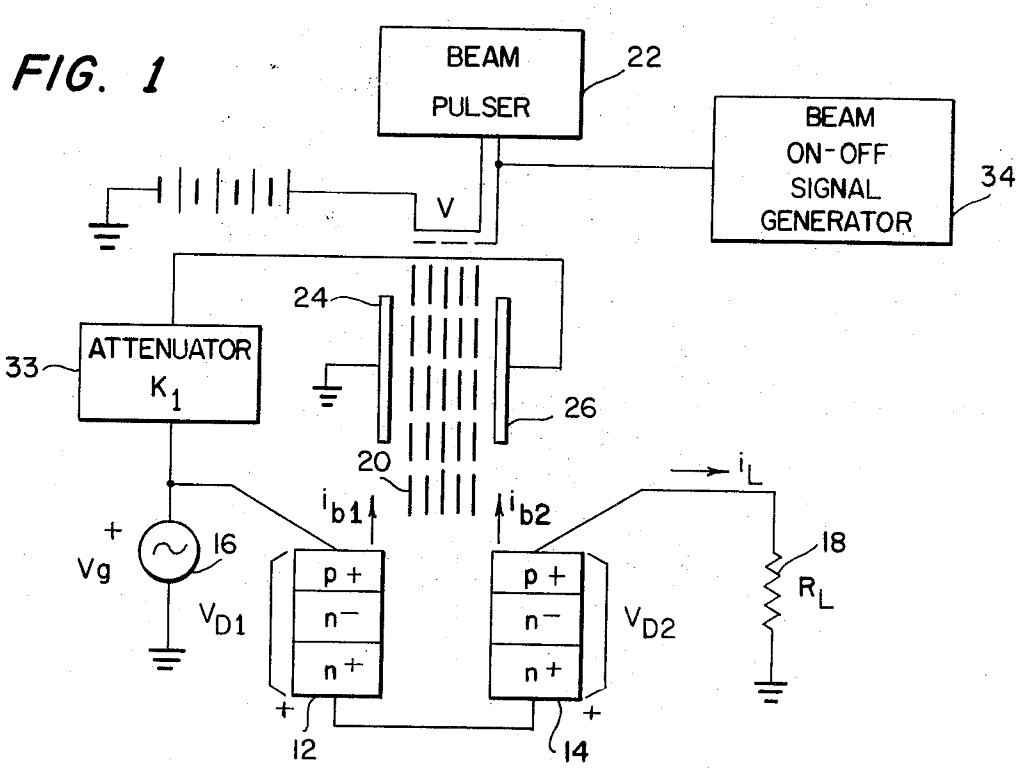
FIG. 1 is a schematic illustration of one embodiment of the invention in which only one semiconductor junction device is irradiated at any one time.

FIG. 1 shows an embodiment of the invention in which two semiconductor p-n junctions 12 and 14 are connected in a back-to-back arrangement in series with an alternating voltage source 16 and a load impedance or resistance 18. The voltage source 16 is the voltage, $v_g$, which is to be switched and which will hereafter be called the "switched voltage." The switched voltage is also connected so as to control the electron beam 20 of a beam pulser 22 which is merely a device for producing a beam of electrons which can be projected. It might, for example, comprise a small grid-cathode structure in a planar microwave triode. In this case, the electron-beam zero position falls between the semiconductor devices 12 and 14 and the position of the beam is varied by applying the switched voltage across a pair of deflection plates 24 and 26.

When no beam impinges on either junction device, no load current flows regardless of the value or polarity of the voltage across the junction devices since the junction devices are opposed to each other. When the electron beam impinges on either junction device, a high current, $Gi_b$, is induced in the device by electron-hole pair generation and this constitutes the load current.

Figure 2:
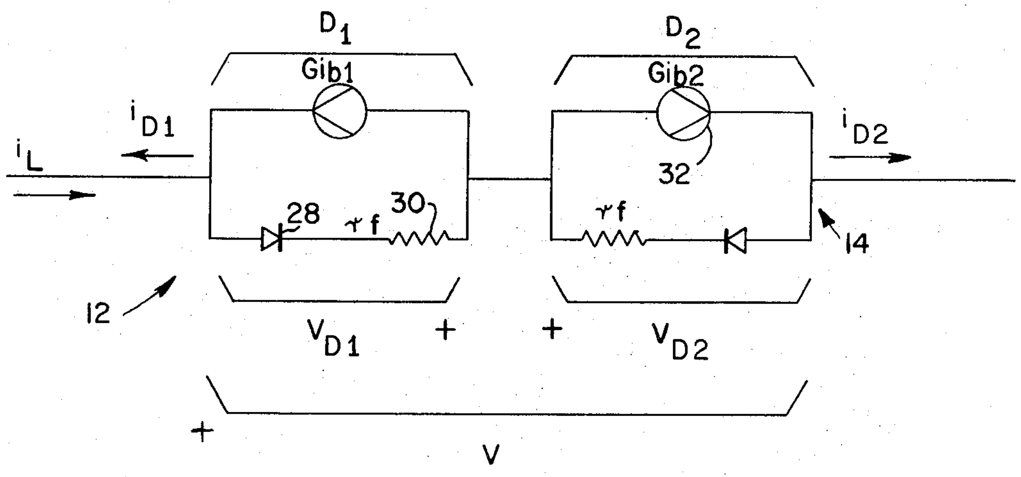
FIG. 2 is a diagram illustrating an approximate equivalent circuit of the two junction devices.

The beam current, which consists of the number of electrons impinging on a semiconductor device, is designated $i_{b1}$ for junction 12 and $i_{b2}$ for junction 14. The load current is $i_L$. A diagram illustrating an approximate equivalent circuit is shown in FIG. 2. When the beam falls on junction 14, its current, $Gi_{b2}$, will he high because of electron-hole pair generation and will constitute the load current, $i_L$. The current, $i_L$, flows from left to right through the diode 28, forward resistance, $r_f$, 30 of junction 12 (D1) and the current source 32 of junction 14 (D2). The amount of current flow is proportional to the value of the beam current and therefore is proportional to the value of the switched voltage, $v_g$. This is because the more positive $v_g$ becomes, the more the beam 20 is swung over to junction 14, the greater the beam current, $i_{b2}$, will be and the greater the load current, $i_L$, will be. The more negative $v_g$ becomes, the more the beam 20 is swung over to junction 12, the greater $i_{b1}$ becomes and the greater the load current, $i_L$, will be in the negative direction. Thus, a sine wave switched voltage, $v_g$, results in a sine wave load voltage.

Figure 3:
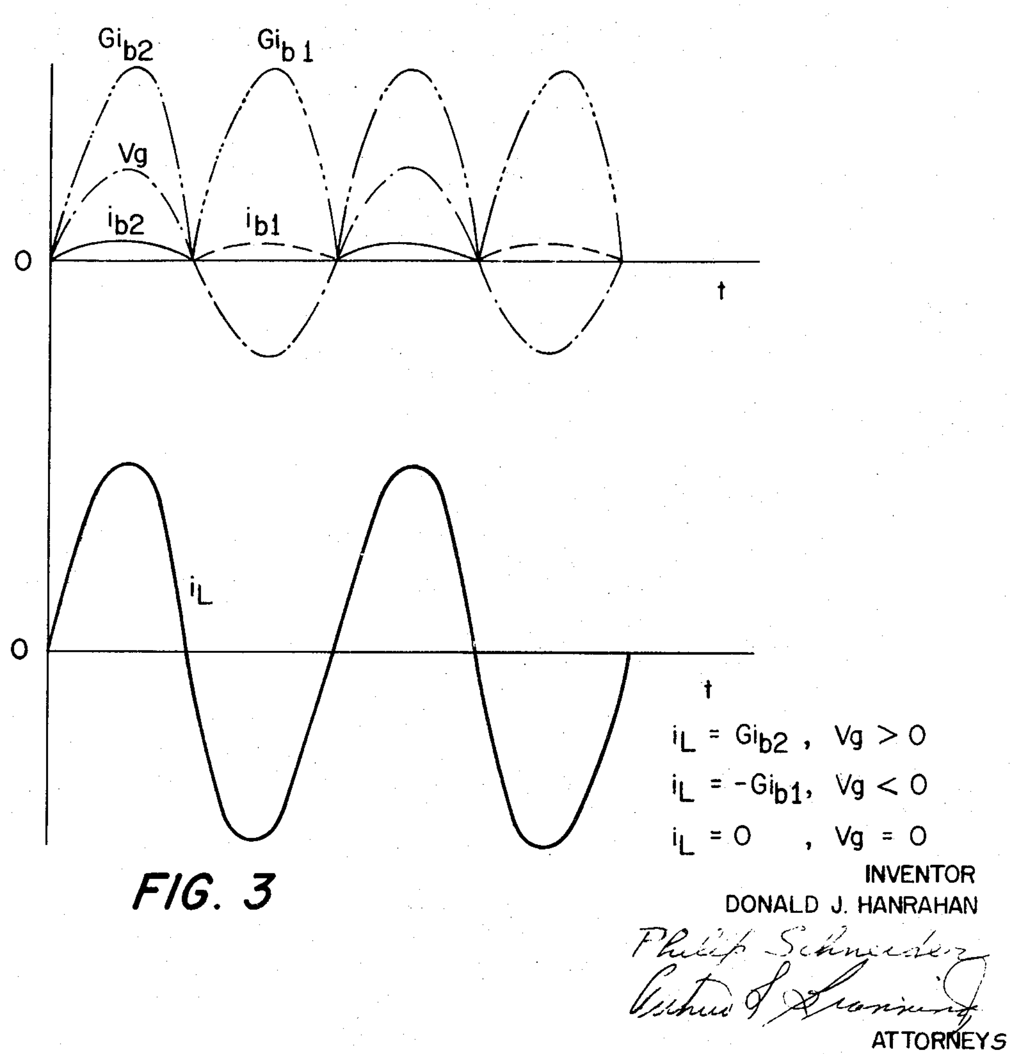
FIG. 3 is an illustration of the waveforms of certain voltages and current in the circuit of FIG. 1.

This is indicated in FIG. 3, which shows the voltage and current waveforms for this circuit. When $v_g > 0$, $i_{b2} > 0$ and $i_L = Gi_{b2}$. When $v_g < 0$, $i_{b1}$ flows, $Gi_{b2} < 0$ (note $i_{b2} = i_{b1}$). It is apparent that the $i_L$ curve follows the switched voltage, $v_g$, curve.

The device can be switched off by returning the beam 20 to its zero position or by means of a signal applied to the grid(s) or the anode(s) of the beam pulser 22. As shown in FIG. 1, the signal from a beam on-off signal generator 34 is applied to one of the grids of the beam pulser 34. The on-off signal generator 34 may generate a negative voltage sufficient to cut off the electron beam 20. A simple manual switching arrangement may be used or more complicated circuits which provide negative pulses of the desired duration.

Figure 4:
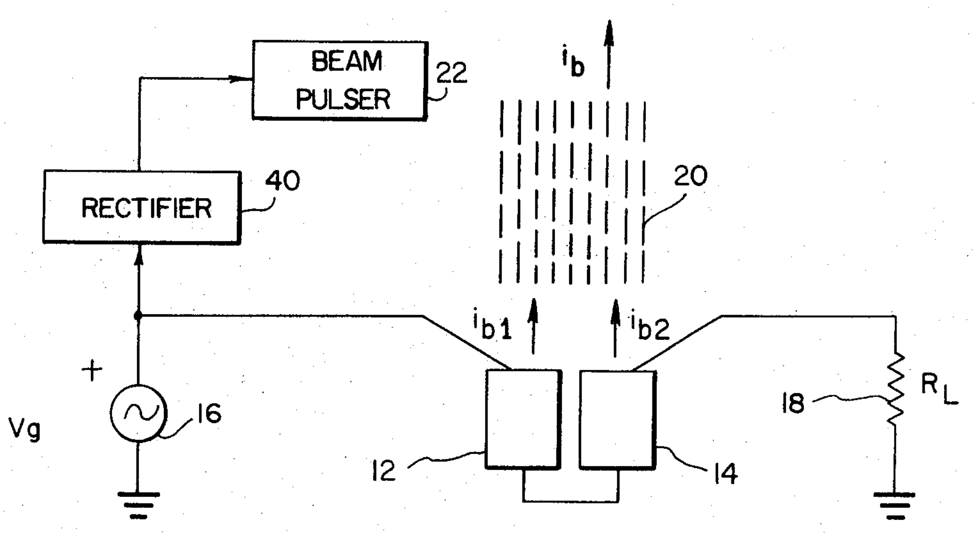
FIG. 4 is a schematic illustration of another embodiment of the invention in which both semiconductor junction devices are irradiated simultaneously.
Figure 5:
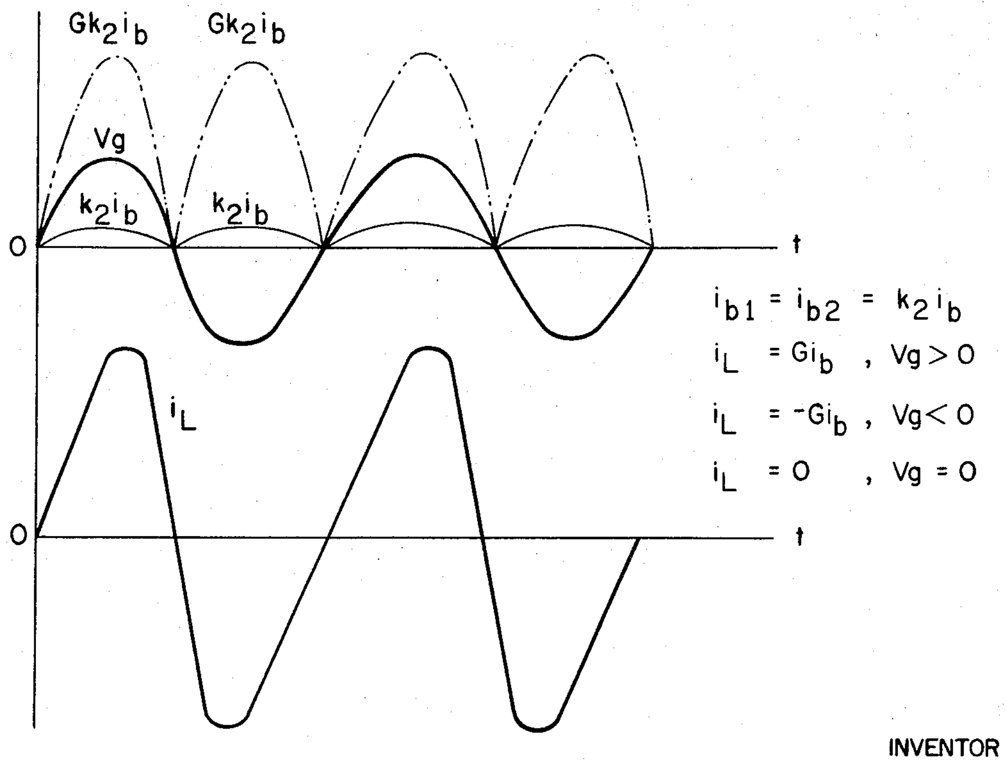
FIG. 5 is an illustration of the waveforms of certain voltages and currents in the circuit of FIG. 4.

A second embodiment of the invention is shown in FIG. 4. Here both semiconductor junction devices 12 and 14 are irradiated by the electron beam 20 simultaneously. The beam 20 must be turned off to stop conduction. Both semiconductor devices are subjected to equal values of beam current at all times. Thus $i_{b1} = i_{b2} = k_2 i_b$ where $0 < k_2 < 0.5$ and $i_b$ is the total beam current. Although it appears from FIG. 2 that $Gi_{b1}$ would always cancel out $Gi_{b2}$, it should be noted that one of the junction devices is always forward-biased by the switched voltage, $v_g$, and, when forward-biased, is short-circuited so that the only external current flowing is that of the other junction device. In this embodiment, the switched voltage, $v_g$, is rectified before being applied to control the beam current since the beam current must always exist for the switch to be closed and for output current, $Gi_b$, to be present. Then $i_b = k_3 |v_g|$, where $k_3$ is some constant and $|v_g|$ is the absolute value of $v_g$, which is always positive. The voltages and currents in this embodiment are shown in FIG. 5. The rectified voltage can then be applied to a grid or anode of the beam pulser 22 to modulate the strength of the beam current. The switch may be opened by either turning the beam off with a voltage to a grid or anode of the beam pulser not used for $|v_g|$, as shown in the embodiment of FIG. 1, or by deflecting the beam completely off the semiconductor junction devices.

If the electron beam strength is not varied in accordance with the value of the switched voltage, $v_g$, but is a fixed value (dc), the load current, $i_L$, will be a square wave with switchover points corresponding to the zero points of the switched voltage, $v_g$. The apparatus, used in this manner, is thus a square-wave generator.

Figure 6:
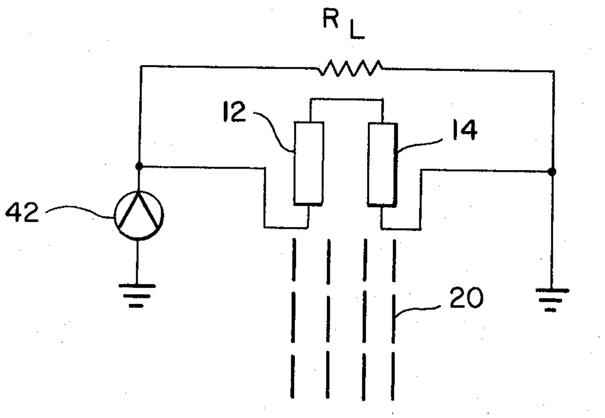
FIG. 6 is a schematic illustration of an embodiment of the invention for switching current sources.

The invention can also be used to switch current sources. (The word "source" is used herein to indicate a source of electrical current or voltage.) FIG. 6 shows how the junction devices 12 and 14 are coupled in parallel with the load, $R_L$, when used to switch the current source, 42, the devices acting like a single-pole, single-throw switch to short out the current through the load when irradiated by the electron beam 20.

Obviously many modification and variations of the present invention are possible in light of the above teachings. It is therefore to be understood that within the scope of the appended claims the invention may be practiced otherwise than as specifically described.

What is claimed and desired to be secured by Letters Patent of the United States is:

1. A hybrid switching device for switching an a.c. electrical source comprising, in combination:
   - at least a pair of semiconductor p-n junction devices coupled back-to-back;
   - means for generating an electron beam for irradiating both of said junction devices;
   - means coupled to said beam-generating means for switching said electron beam on or off at desired times; and
   - means coupled to said beam-generating means for controlling a beam characteristic in accordance with the variations in said switched source.

2. A device as in claim 1, wherein said beam characteristic which is controlled is beam position relative to said junction devices.

3. A device as in claim 1, wherein said beam characteristic which is controlled is beam strength.

4. A device as in claim 2, wherein said beam irradiates only one junction device at a time.

5. A device as in claim 3, wherein said beam irradiates both devices simultaneously.

6. A device as in claim 5, wherein said means for controlling a beam characteristic includes means for rectifying said switched source, said rectified voltage being applied to said means for generating an electron beam to control the beam strength thereof.

* * * * *